United States Patent
Tang

(10) Patent No.: US 11,356,935 B2
(45) Date of Patent: Jun. 7, 2022

(54) METHOD FOR CONTROLLING CELL SEARCH OF UE, AND UE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/940,963

(22) Filed: Jul. 28, 2020

(65) Prior Publication Data

US 2020/0359306 A1 Nov. 12, 2020

Related U.S. Application Data

(63) Continuation of application No. PCT/CN2018/074430, filed on Jan. 29, 2018.

(51) Int. Cl.
*H04W 48/16* (2009.01)

(52) U.S. Cl.
CPC .................................. *H04W 48/16* (2013.01)

(58) Field of Classification Search
CPC ...... H04W 48/16; H04W 48/20; H04W 48/12
See application file for complete search history.

(56) References Cited

U.S. PATENT DOCUMENTS

| 8,731,554 B2 | 5/2014 | Yoshihara |
| 2011/0080895 A1 | 4/2011 | Iwamura |
| 2012/0135737 A1 | 5/2012 | Yoshihara |
| 2016/0255563 A1* | 9/2016 | Callender ............. H04W 36/32 |
| | | 455/437 |
| 2019/0069256 A1* | 2/2019 | Jung ....................... H04L 5/005 |

FOREIGN PATENT DOCUMENTS

CN          101562848 A      10/2009

OTHER PUBLICATIONS

3GPP TS 36.304 V14.5.0 (Dec. 2017), Technical Specification Group Radio Access Network, Evolved Universal Terrestrial Radio Access (EUTRA), "User Equipment (UE) procedures in idle mode", (Release 14), pp. 1-49, Dec. 2017.

(Continued)

*Primary Examiner* — Minjung Kim
(74) *Attorney, Agent, or Firm* — Ladas & Parry LLP

(57) ABSTRACT

A method for controlling cell search of User Equipment (UE) includes: receiving frequency layer information corresponding to a Synchronization Signal and PBCH Block (SSB) index from a network side through a system broadcast; determining at least one to-be-searched cell with a high frequency priority based on a retrieved beam index or the frequency layer information corresponding to the SSB index, the cell with a high frequency priority being a cell of which a frequency priority is higher than a frequency priority of a cell where the UE is presently located; and searching the at least one to-be-searched cell with a high frequency priority based on a search time interval. The search time interval is a minimum time interval, meeting a performance requirement, for all cells with high frequency priority.

9 Claims, 4 Drawing Sheets

(56) References Cited

OTHER PUBLICATIONS

Written Opinion of the International Search Authority in the international application No. PCT/CN2018/074430, dated Oct. 18, 2018.
Huawei, Hisilicon. "Distributing UEs to Multiple Carriers" 3GPP TSG-RAN WG2 #91bis R2-154623, Oct. 9, 2015 (Oct. 9, 2015), section 2.1, and figure 1.
Internatonal Search Report in the international application No. PCT/CN2018/074430, dated Oct. 18, 2018.
Nokia et al: "E-UTRA Cell Selection and Cell Reselection Aspects", 3GPP Draft; R2-073622 E-Utra Cell Reselectons, 3rd Generation Partnership Project (3GPP), Mobile Competence Centre; 650, Route Des Lucioles; F-06921 Sophia-Antipolis Cedex; France, vol. RAN WG2, No. Athens, Greece; Aug. 17, 2007, Aug. 17, 2007 (Aug. 17, 2007), XP050136308, [retrieved on Aug. 17, 2007] *1 Introduction* * 2.3 Inter-frequency cell reselections between frequency layers with different priorities * *5 Conclusions *.
NTT DOCOMO et al: "Remaining issues on UE measurement capability requirements", 3GPP Draft; R4-1800563_Discussion on UE Measurement Capability Requirements V1, 3rd Generation Partnership Project (3GPP), Mobile Competence Centre; 650, Route Des Lucioles; F-06921 Sophia-Antipolis, vol. RAN WG4, No. San Diego, US; Jan. 22, 2018-Jan. 26, 2018, Jan. 15, 2018 (Jan. 15, 2018), XP051388191, * figure 4 * * Proposals 1-4 *.
OPPO: "Discussion on cell quality for cell selection and reselection", 3GPP Draft; R2-1800276—Discussion on Cell Quality for Cell Selection and Reslection-V1, 3rd Generation Partnership Project (3GPP), Mobile Competence Centre; 650, Route Des Lucioles; F-06921 Sophia, vol. RAN WG2, No. Vancouver, Canada; Jan. 22, 2018-Jan. 26, 2018, Jan. 12, 2018 (Jan. 12, 2018), XP051386118, * the whole document *.
OPPO: "Higher priority frequency searching relaxes for UE power saving", 3GPP Draft; R2-1905594—Higher Priority Frequency Searching Relaxes for UE Power Saving, 3rd Generation Partnership Project (3GPP), Mobile Competence Centre; 650, Route Des Lucioles; F-06921 Sophia, vol. RAN WG2. No. Reno. USA; Apr. 13, 2019-Apr. 17, 2019, May 13, 2019 (May 13, 2019), XP051729097, *the whole document *.
Supplementary European Search Report in the European application No. 18902485.4, dated Dec. 21, 2020.

\* cited by examiner

METHOD FOR CONTROLLING CELL SEARCH OF UE, AND UE

CROSS-REFERENCE TO RELATED APPLICATION

This application is a U.S. continuation application of International Application No. PCT/CN 2018/074430, entitled "METHOD FOR CONTROLLING UE TO SEARCH FOR CELL, UE, AND NETWORK DEVICE", filed on Jan. 29, 2018, the disclosure of which is hereby incorporated by reference in its entirety.

BACKGROUND

When UE executes cell selection and reselection in an idle state, for meeting load balance in the idle state, a frequency-priority-based cell reselection policy is defined. Specifically, in an intra-frequency cell reselection or an inter-frequency cell reselection with the same frequency priority, an R criterion is adopted for cell reselection, namely cells are sequenced according to signal quality of the cells, and the cell with highest signal quality is selected as a candidate reselection target cell. For a cell with a high frequency priority, the cell with the high frequency priority is reselected when signal quality of the cell meets a certain threshold. A cell with a low frequency priority may be reselected only when signal quality of a serving cell is lower than a certain threshold.

Frequency-priority-based cell reselection may also be adopted for present NR cells. However, if UE searches cells with high priorities more frequently, power consumption is higher.

SUMMARY

For solving the technical problem, embodiments of the disclosure provide a method for controlling cell search of UE and a UE.

The embodiments of the disclosure provide a method for controlling cell search of UE, which is applied to the UE and includes the following operations.

Frequency layer information corresponding to a Synchronization Signal and PBCH Block (SSB) index is received from a network side through a system broadcast.

At least one to-be-searched cell with a high frequency priority is determined based on a retrieved beam index or the frequency layer information corresponding to the SSB index. The cell with a high frequency priority is a cell of which a frequency priority is higher than a frequency priority of a cell where the UE is currently located.

The at least one to-be-searched cell with a high frequency priority is searched based on a search time interval. The search time interval is a minimum time interval, meeting a performance requirement, for all cells with high frequency priority.

The embodiments of the disclosure provide a method for controlling cell search of UE, which is applied to a network device and includes the following operation.

SSB-index-based frequency layer information is sent to UE through a system broadcast.

The embodiments of the disclosure provide a UE, which includes a processor, a memory for storing a computer program executable by the processor and a network interface. The processor is configured to run the computer program to cooperate with the network interface to perform the following operations.

Frequency layer information corresponding to an SSB index is received from a network side through a system broadcast.

At least one to-be-searched cell with a high frequency priority is determined based on a retrieved beam index or the frequency layer information corresponding to the SSB index. The cell with a high frequency priority is a cell of which a frequency priority is higher than a frequency priority of a cell where the UE is currently located.

The at least one to-be-searched cell with a high frequency priority is searched based on a search time interval. The search time interval is a minimum time interval, meeting a performance requirement, for all cells with high frequency priority.

DETAILED DESCRIPTION

For making the characteristics and technical contents of the embodiments of the disclosure understood in more detail, implementation of the embodiments of the disclosure will be described below in combination with the drawings in detail. The drawings are only adopted for reference and description, and not intended to limit the embodiments of the disclosure.

First Embodiment

Figure 1:
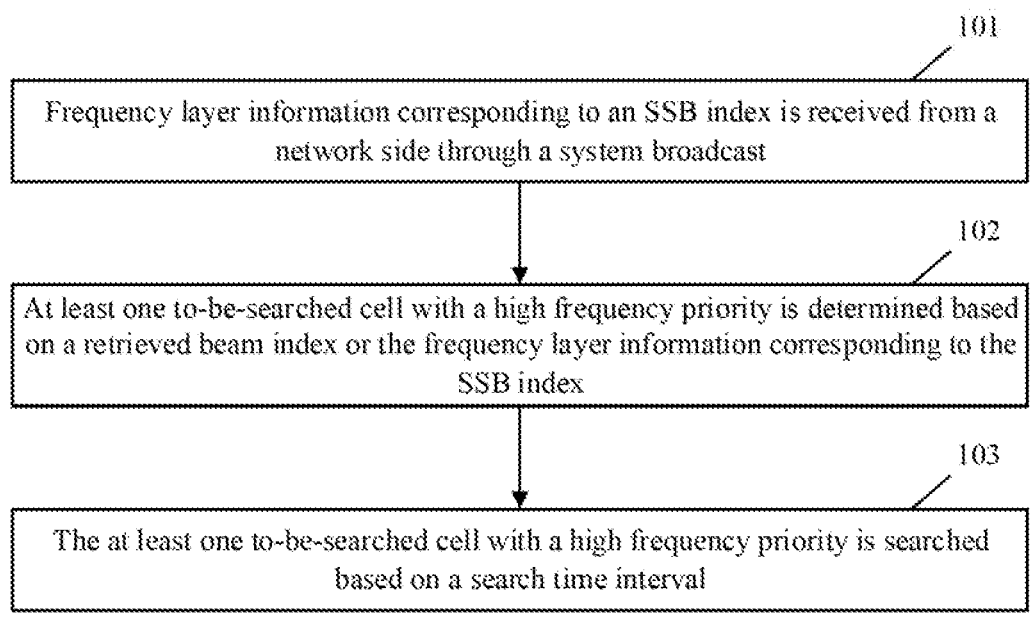
FIG. 1 is a flowchart of a method for controlling cell search of UE according to an embodiment of the disclosure.

The embodiment of the disclosure provides a method for controlling cell search of UE, which is applied to the UE. As shown in FIG. 1, the method includes the following operations.

At block 101, frequency layer information corresponding to an SSB index is received from a network side through a system broadcast.

At block 102, at least one to-be-searched cell with a high frequency priority is determined based on a retrieved beam index or the frequency layer information corresponding to the SSB index. The cell with a high frequency priority is a cell of which a frequency priority is higher than that of a cell where the UE is currently located.

At block 103, the at least one to-be-searched cell with a high frequency priority is searched based on a search time interval. The search time interval is a minimum time interval, meeting a performance requirement, for all cells with high frequency priority.

In the embodiment, the UE may be a terminal device such as a smart phone. Exhaustions are omitted.

System broadcast information may be transmitted through a base station on the network side.

The frequency layer information is a number of frequency layers, or frequencies of all neighbor cell frequency layers and neighbor cell configuration information corresponding to the frequencies.

Specifically, the SSB-index-based frequency layer information may be broadcast through the system broadcast. The UE determines all frequency layers with high priority according to the retrieved beam index.

The minimum search time interval, meeting the performance requirement, for all cells with high frequency priority is defined based on a Radio Access Network 4 (RAN4). For example, it is defined to be T.

Based on the above descriptions, descriptions will further be made below in combination with multiple processing manners.

A First Processing Manner

The method further includes the following operations. A correction factor broadcast by the network side is received. The correction factor is related to at least one of the following information: the frequency priority of the cell where the UE is currently located, a load state in the network side, the number of frequency priorities that may be acquired in a neighbor cell of the UE and is higher than that of the cell where the UE is currently located, and the highest priority that may be acquired in the neighbor cell. The search time interval is corrected based on the correction factor.

With respect to a manner for determining the correction factor, the correction factor corresponding to the UE may be determined by a base station side based on at least one of the following information: the frequency priority of the cell where the UE is currently located, the load state in the network side, the number of the frequency priorities that may be acquired in the neighbor cell of the UE and is higher than that of the cell where the UE is currently located, and the highest priority that may be acquired in the neighbor cell.

Specifically, the abovementioned information may be combined for use, or only one piece of information may be used. For example, when the frequency priority of the cell where the UE is located is 2 and the number of the frequency priorities, higher than the present frequency priority, in the neighbor cell is 3, the correction factor may be relatively great, that is, regulation to a frequency with a higher priority may not always be required. Of course, the specific determination manner may be regulated by the network side according to a practical condition. Exhaustions are omitted in the embodiment.

The network side broadcasts the correction factor f based on the frequency priority of the present cell, the load state in the network side, the number of higher priorities that may be acquired in the neighbor cell and the highest priority. The correction factor is used to correct the time interval for searching the cell with a high frequency priority. The final search time interval for searching the cell with a high frequency priority is T*f.

Specifically, a manner for receiving the correction factor broadcast by the network side includes that: the correction factor broadcast together with the SSB index by the network side is received. Specifically, the factor may be broadcast through the system broadcast. Optionally, the factor may be broadcast together with the SSB index, that is, each beam index corresponds to a respective factor.

The operation that the minimum time interval is corrected based on the correction factor includes the following actions.

The UE acquires a present SSB index and selects a correction factor corresponding to the present SSB index. The search time interval is corrected based on the correction factor corresponding to the present SSE index. Specifically, the search time interval is multiplied by the correction factor to obtain a corrected search time interval.

That is, the UE acquires the present SSB index, and then selects a proper factor through a correspondence between a broadcast SSE index and factor to correct the time interval for all cells with high priority.

A Second Processing Manner

At least one first correction factor defined by a RAN4 is stored. Each first correction factor corresponds to two dimensions: a difference value between the frequency priority of the cell where the UE is located and a target frequency priority to be searched by the UE, and the frequency priority of the cell where the UE is located.

That is, a UE side may pre-store a list. The list is determined by parameters of two dimensions: one parameter is used to represent the difference value and the other parameter is used to represent the frequency priority. The difference value may be the difference value between the frequency priority of the cell where the UE is located and the target frequency priority to be searched by the UE. The other parameter representing the frequency priority may be the frequency priority of the cell where the UE is currently located. The first correction factor (represented as a correction factor 1 hereinafter) may be uniquely determined based on the two parameters.

That is, the RAN4 may define the two dimensions: a difference between the frequency priority of the present cell and the target frequency priority and the present frequency priority, to determine the correction factor 1 for all the cells with high frequency priority.

A manner for correcting the search time interval in this processing manner may be as follows.

The first correction factor is determined based on the frequency priority of the cell where the UE is currently located and the target frequency priority to be searched by the UE.

A second correction factor (i.e., a correction factor 2 hereinafter) corresponding to the SSB index is selected based on the present SSB index.

The corrected search time interval is determined based on the first correction factor and the second correction factor.

The correction factor 2 may be selected in the following manner. A correction factor 2 corresponding to each SSB index is broadcast through the system broadcast, that is, each beam index corresponds to a respective correction factor 2.

The UE acquires the present SSB index and then selects a proper factor 2 through the correspondence between the broadcast SSB index and factor.

The UE determines the time interval for searching the cell with high priority according to the frequency layer with high priority, the correction factor 1 and the correction factor 2.

Specifically, the operation that the corrected search time interval is determined based on the first correction factor and the second correction factor includes the following action. The search time interval is multiplied by the first correction factor and then multiplied by the second correction factor to obtain the corrected search time interval.

It can be seen that, with adoption of the solution, the at least one to-be-searched cell with a high frequency priority may be determined based on the retrieved beam index or the frequency layer information corresponding to the SSB index, the cell with a high frequency priority being a cell of which the frequency priority is higher than the frequency priority of the cell where the UE is currently located, and the at least one to-be-searched cell with a high frequency priority is searched based on the search time internal. In such a manner, the search time interval for searching the cell with a high frequency priority may be prolonged, so that the purpose of reducing power consumption of the UE is achieved.

Second Embodiment

The embodiment of the disclosure provides a method for controlling cell search of UE, which is applied to a network device and includes the following operation. SSB-index-based frequency layer information is sent to UE through a system broadcast.

In the embodiment, the UE may be a terminal device such as a smart phone. Exhaustions are omitted. The network device may be a base station.

System broadcast information may be transmitted through the base station in a network side.

The frequency layer information is a number of frequency layers, or frequencies of all neighbor cell frequency layers and neighbor cell configuration information corresponding to the frequencies.

Specifically, the SSB-index-based frequency layer information may be broadcast through the system broadcast. The UE determines all frequency layers with high priority according to a retrieved beam index.

A minimum search time interval, meeting a performance requirement, for all cells with high frequency priority is defined based on a RAN4. For example, it is defined to be T.

Based on the above descriptions, descriptions will further be made below in combination with multiple processing manners.

A First Processing Manner

The method further includes the following operations. A correction factor for a search time interval is determined based on at least one of the following information: a frequency priority of a cell where the UE is currently located, a load state in the network side, the number of frequency priorities that may be acquired in a neighbor cell of the UE and is higher than that of the cell where the UE is currently located, and the highest priority that may be acquired in the neighbor cell. The correction factor for the search time interval is sent to the UE through the system broadcast.

With respect to a manner for determining the correction factor, the correction factor corresponding to the UE may be determined for the UE by a base station side based on at least one of the following information: the frequency priority of the cell where the UE is currently located, the load state in the network side, the number of the frequency priorities that may be acquired in the neighbor cell of the UE and is higher than that of the cell where the UE is currently located, and the highest priority that may be acquired in the neighbor cell.

Specifically, the abovementioned information may be combined for use, or only one piece of information may be used. For example, when the frequency priority of the cell where the UE is located is 2 and the number of the frequency priorities, higher than the present frequency priority, in the neighbor cell is 3, the correction factor may be relatively great, that is, regulation to a frequency with a higher priority may not always be required. Of course, the specific determination manner may be regulated by the network side according to a practical condition. Exhaustions are omitted in the embodiment.

The network side broadcasts the correction factor f based on the frequency priority of the present cell, the load state in the network side, the number of higher priorities that may be acquired in the neighbor cell and the highest priority. The correction factor is used to correct the time interval for searching the cell with a high frequency priority. The final search time interval for searching the cell with a high frequency priority is T*f.

A manner for receiving the correction factor broadcast by the network side includes that: the correction factor for the search time interval is sent to the UE through the system broadcast, which includes the following operation.

An SSB index and a correction factor corresponding to the SSB index are sent to the UE together through the system broadcast. Specifically, the factor may be broadcast through the system broadcast. Optionally, the correction factor may be broadcast together with the SSB index, that is, each beam index corresponds to a respective factor.

The operation that the minimum time interval is corrected based on the correction factor includes the following action. The search time interval is multiplied by the correction factor to obtain a corrected search time interval.

That is, the UE acquires a present SSB index and then selects a proper factor through a correspondence between a broadcast SSB index and factor to correct the time interval for all cells with the high priority.

A Second Processing Manner

At least one first correction factor defined by a RAN4 is stored. Each first correction factor corresponds to two dimensions: a difference value between the frequency priority of the cell where the UE is located and a target frequency priority to be searched by the UE, and the frequency priority of the cell where the UE is located.

That is, both a UE side and the network side may pre-store a list. The list is determined by parameters of two dimensions: one parameter is used to represent the difference value and the other parameter is used to represent the frequency priority. The difference value may be the difference value between the frequency priority of the cell where the UE is located and the target frequency priority to be searched by the UE. The other parameter representing the frequency priority may be the frequency priority of the cell where the UE is currently located. The first correction factor (represented as a correction factor 1 hereinafter) may be uniquely determined based on the two parameters.

That is, the RAN4 may define the two dimensions: a difference between the frequency priority of the present cell and the target frequency priority, and the present frequency priority, to determine the correction factor 1 for all the cells with high frequency priority.

A second correction factor (i.e. a correction factor 2 hereinafter) corresponding to the SSB index is broadcast through the system broadcast.

Correspondingly, the UE may determine the corrected search time interval based on the first correction factor and the second correction factor.

The correction factor 2 may be selected in the following manner. A correction factor 2 corresponding to each SSB index is broadcast through the system broadcast, that is, each beam index corresponds to a respective correction factor 2.

The UE acquires the present SSB index and then selects a proper factor 2 through the correspondence between the broadcast SSB index and factor.

The UE determines the time interval for searching the cell with high priority according to the frequency layer with high priority, the correction factor 1 and the correction factor 2.

Specifically, the operation that the corrected search time interval is determined based on the first correction factor and the second correction factor includes the following action. The search time interval is multiplied by the first correction factor and then multiplied by the second correction factor to obtain the corrected search time interval.

It can be seen that, with the above solution, the at least one to-be-searched cell with a high frequency priority may be determined based on the retrieved beam index or the frequency layer information corresponding to the SSB index. The cell with a high frequency priority is a cell of which the frequency priority is higher than the frequency priority of the cell where the UE is currently located. The at least one to-be-searched cell with a high frequency priority is searched based on the search time interval. In such a manner, the search time interval for searching the cell with a high frequency priority may be prolonged, so that the purpose of reducing power consumption of the UE is achieved.

Third Embodiment

Figure 2:
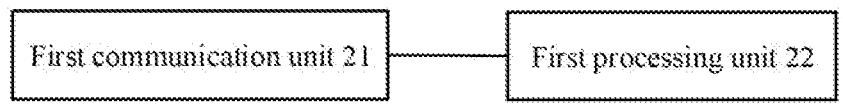
FIG. 2 is a schematic structural diagram of UE according to an embodiment of the disclosure.

The embodiment of the disclosure provides UE. As shown in FIG. 2, the UE includes a first communication unit 21 and a first processing unit 32.

The first communication unit 21 is configured to receive frequency layer information corresponding to an SSB index from a network side through a system broadcast and search at least one to-be-searched cell with a high frequency priority based on a search time interval. The search time interval is a minimum time interval, meeting a performance requirement, for all cells with high frequency priority.

The first processing unit 22 is configured to determine the at least one to-be-searched cell with a high frequency priority based on a retrieved beam index or the frequency layer information corresponding to the SSB index. The cell with a high frequency priority is a cell of which the frequency priority is higher than a frequency priority of a cell where the UE is currently located.

In the embodiment, the UE may be a terminal device such as a smart phone. Exhaustions are omitted.

System broadcast information may be transmitted through a base station on the network side.

The frequency layer information is a number of frequency layers, or frequencies of all neighbor cell frequency layers and neighbor cell configuration information corresponding to the frequencies.

Specifically, the SSB-index-based frequency layer information may be broadcast through the system broadcast. The UE determines all frequency layers with high priority according to the retrieved beam index.

The minimum search time interval, meeting the performance requirement, for all the cells with high frequency priority is defined based on a RAN4. For example, it is defined to be T.

Based on the above descriptions, descriptions will further be made below in combination with multiple processing manners.

A First Processing Manner

The first communication unit 21 is configured to receive a correction factor broadcast by the network side. The correction factor is related to at least one of the following information: the frequency priority of the cell where the UE is currently located, a load state in the network side, the number of frequency priorities that may be acquired in a neighbor cell of the UE and is higher than that of the cell where the UE is currently located, and the highest priority that may be acquired in the neighbor cell.

The first processing unit 22 is configured to correct the search time interval based on the correction factor.

With respect to a manner for determining the correction factor, the correction factor corresponding to the UE may be determined by a base station side based on at least one of the following information: the frequency priority of the cell where the UE is currently located, the load state in the network side, the number of the frequency priorities that may be acquired in the neighbor cell of the UE and is higher than that of the cell where the UE is currently located, and the highest priority that may be acquired in the neighbor cell.

Specifically, the above-mentioned information may be combined for use, or only one piece of information may be used. For example, when the frequency priority of the cell where the UE is located is 2 and the number of the frequency priorities, higher than the present frequency priority, in the neighbor cell is 3, the correction factor may be relatively great, that is, regulation to a frequency with a higher priority may not always be required. Of course, the specific determination manner may be regulated by the network side according to a practical condition. Exhaustions are omitted in the embodiment.

The network side broadcasts the correction factor f based on the frequency priority of the present cell, the load state in the network side, the number of higher priorities that may be acquired in the neighbor cell and the highest priority. The correction factor is used to correct the time interval for searching the cell with a high frequency priority. The final search time interval for searching the cell with a high frequency priority is $T*f$.

Specifically, a manner for receiving the correction factor broadcast by the network side includes that: the first communication unit 21 receives the correction factor broadcast together with the SSB index by the network side. Specifically, the factor may be broadcast through the system broadcast. Optionally, the factor may be broadcast together with the SSB index, that is, each beam index corresponds to a respective factor.

The first processing unit 22 is configured to acquire a present SSB index, select a correction factor corresponding to the present SSB index and correct the search time interval based on the correction factor corresponding to the present SSB index. Specifically, the search time interval is multiplied by the correction factor to obtain a corrected search time interval.

That is, the UE acquires a present SSB index, and then selects a proper factor through a correspondence between a broadcast SSB index and factor to correct the time interval for all cells with high priority.

A Second Processing Manner

The first processing unit 22 is configured to store at least one first correction factor defined by a RAN4. Each first correction factor corresponds to two dimensions: a difference value between the frequency priority of the cell where the UE is located and a target frequency priority to be searched by the UE, and the frequency priority of the cell where the UE is located.

That is, a UE side may pre-store a list. The list is determined by parameters of two dimensions: one parameter is used to represent the difference value and the other parameter is used to represent the frequency priority. The difference value may be the difference value between the frequency priority of the cell where the UE is located and the target frequency priority to be searched by the UE. The other parameter representing the frequency priority may be the frequency priority of the cell where the UE is currently located. The first correction factor (represented as a correction factor 1 hereinafter) may be uniquely determined based on the two parameters.

That is, the RAN4 may define the two dimensions: a difference between the frequency priority of the present cell and the target frequency priority, and the present frequency priority, to determine the correction factor 1 for all the cells with high frequency priority.

The first processing unit 22 is configured to perform the following operations. The first correction factor is determined based on the frequency priority of the cell where the UE is currently located and the target frequency priority to be searched by the UE.

A second correction factor (i.e., a correction factor 2 hereinafter) corresponding to the SSB index is selected based on the present SSB index.

The corrected search time interval is determined based on the first correction factor and the second correction factor.

The correction factor 2 may be selected in the following manner. A correction factor 2 corresponding to each SSB index is broadcast through the system broadcast, that is, each beam index corresponds to a respective correction factor 2.

The UE acquires the present SSB index and then selects a proper factor 2 through the correspondence between the broadcast SSB index and the factor.

The UE determines the time interval for searching the cell with high priority according to the frequency layer with high priority, the correction factor 1 and the correction factor 2.

Specifically, the first processing unit 22 is configured to multiply the search time interval by the first correction factor and then by the second correction factor to obtain the corrected search time interval.

It can be seen that, with the above solution, the at least one to-be-searched cell with a high frequency priority may be determined based on the retrieved beam index or the frequency layer information corresponding to the SSB index. The cell with a high frequency priority is a cell of which the frequency priority is higher than the frequency priority of the cell where the UE is currently located. The at least one to-be-searched cell with a high frequency priority is searched based on the search time interval. In such a manner, the search time interval for searching the cell with a high frequency priority may be prolonged, so that the purpose of reducing power consumption of the UE is achieved.

Fourth Embodiment

Figure 3:
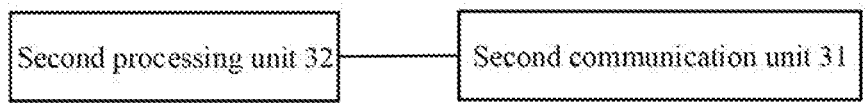
FIG. 3 is a schematic structural diagram of a network device according to an embodiment of the disclosure.

The embodiment of the disclosure provides a network device. As shown in FIG. 3, the network device includes a second communication unit 31, configured to send SSB-index-based frequency layer information to UE through a system broadcast.

In the embodiment, the UE may be a terminal device such as a smart phone. Exhaustions are omitted. The network device may be a base station.

System broadcast information may be transmitted through the base station on a network side.

The frequency layer information is a number of frequency layers, or frequencies of all neighbor cell frequency layers and neighbor cell configuration information corresponding to the frequencies.

Specifically, the SSB-index-based frequency layer information may be broadcast through the system broadcast. The UE determines all frequency layers with high priority according to a retrieved beam index.

A minimum search time interval, meeting a performance requirement, for all cells with high frequency priority is defined based on a RAN4. For example, it is defined to be T.

Based on the above descriptions, descriptions will further be made below in combination with multiple processing manners.

A First Processing Manner

The network device further includes a second processing unit 32.

The second processing unit 32 is configured to determine a correction factor for the search time interval based on at least one of the following information: a frequency priority of a cell where the UE is currently located, a load state in the network side, the number of frequency priorities that may be acquired in a neighbor cell of the UE and is higher than that of the cell where the UE is currently located, and the highest priority that may be acquired in the neighbor cell. The second communication unit 31 is configured to send the correction factor for the search time interval to the UE through the system broadcast.

With respect to a manner for determining the correction factor, the correction factor corresponding to the UE may be determined for the UE by a base station side based on at least one of the following information: the frequency priority of the cell where the UE is currently located, the load state in the network side, the number of the frequency priorities that may be acquired in the neighbor cell of the UE and is higher than that of the cell where the UE is currently located, and the highest priority that may be acquired in the neighbor cell.

Specifically, the abovementioned information may be combined for use, or only one piece of information may be used. For example, when the frequency priority of the cell where the UE is located is 2 and the number of the frequency priorities, higher than the present frequency priority, in the neighbor cell is 3, the correction factor may be relatively great, that is, regulation to a frequency with a higher priority may not always be required. Of course, the specific determination manner may be regulated by the network side according to a practical condition. Exhaustions are omitted in the embodiment.

The network side broadcasts the correction factor f based on the frequency priority of the present cell, the load state in the network side, the number of higher priorities that may be acquired in the neighbor cell and the highest priority. The correction factor is used to correct the time interval for searching the cell with a high frequency priority. The final search time interval for searching the cell with a high frequency priority is T*f.

A manner for receiving the correction factor broadcast by the network side is as follows. The second communication unit 31 is configured to send an SSB index and a correction factor corresponding to the SSB index to the UE together through the system broadcast. Specifically, the factor may be broadcast through the system broadcast. Optionally, the factor may be broadcast together with the SSB index, that is, each beam index corresponds to a respective factor.

That is, the UE acquires a present SSB index and then selects a proper factor through a correspondence between a broadcast SSB index and factor to correct the time interval for all cells with high priority.

A Second Processing Manner

At least one first correction factor defined by a RAN4 is stored. Each first correction factor corresponds to two dimensions: a difference value between the frequency priority of the cell where the UE is located and a target frequency priority to be searched by the UE, and the frequency priority of the cell where the UE is located.

That is, both a UE side and the network side may pre-store a list. The list determined by parameters of two dimensions: one parameter is used to represent the difference value and the other parameter is used to represent the frequency priority. The difference value may be the difference value between the frequency priority of the cell where the UE is located and the target frequency priority to be searched by the UE. The other parameter representing the frequency priority may be the frequency priority of the cell where the UE is currently located. The first correction factor (represented as a correction factor 1 hereinafter) may be uniquely determined based on the two parameters.

That is, the RAN4 may define the two dimensions: a difference between the frequency priority of the present cell and the target frequency priority, and the present frequency priority, to determine the correction factor 1 for all the cells with high frequency priority.

The second communication unit 31 is configured to broadcast a second correction factor (i.e., a correction factor 2 hereinafter) corresponding to the SSB index through the system broadcast.

Correspondingly, the UE may determine the corrected search time interval based on the first correction factor and the second correction factor.

The correction factor 2 may be selected in the following manner. A correction factor 2 corresponding to each SSB index is broadcast through the system broadcast, that is, each beam index corresponds to a respective correction factor 2.

The UE acquires the present SSB index and then selects a proper factor 2 through the correspondence between the broadcast SSB index and factor.

The UE determines the time interval for searching the cell with high priority according to the frequency layer with high priority, the correction factor 1 and the correction factor 2.

It can be seen that, with the above solution, the at least one to-be-searched cell with a high frequency priority may be determined based on the retrieved beam index or the frequency layer information corresponding to the SSB index. The cell with a high frequency priority is a cell of which the frequency priority is higher than the frequency priority of the cell where the UE is currently located. The at least one to-be-searched cell with a high frequency priority is searched based on the search time interval. In such a manner, the search time interval fur searching the cell with a high frequency priority may be prolonged, so that the purpose of reducing power consumption of the UE is achieved.

Figure 4:
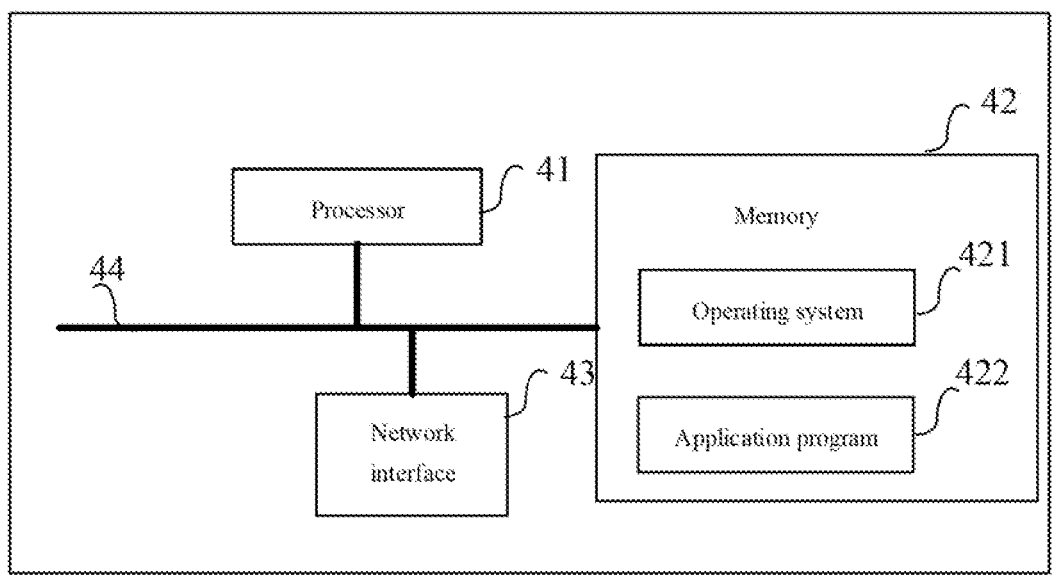
FIG. 4 is a schematic diagram of a hardware architecture according to an embodiment of the disclosure.

An embodiment of the disclosure also provides a hardware composition architecture of UE or a receiver device. As shown in FIG. 4, the UE includes at least one processor 41, a memory 42 and at least one network interface 43. Various components are coupled together through a bus system 44. It can be understood that the bus system 44 is configured to implement connection and communication between these components. The bus system 44 includes a data bus and further includes a power bus, a control bus and a state signal bus. However, for clear description, various buses in FIG. 4 are marked as the bus system 44.

It can be understood that the memory 42 in the embodiment of the disclosure may be a volatile memory or a nonvolatile memory, or may include both the volatile and nonvolatile memories.

In some implementations, the memory 42 stores the following elements: executable modules or data structures, or a subset thereof or an extended set thereof, such as an operating system 421 and an application program 422.

Herein the processor 41 is configured to be capable of processing the operations in the method in the first embodiment or the second embodiment, which will not be elaborated herein.

An embodiment of the disclosure provides a computer storage medium, which stores a computer-executable instruction, the computer-executable instruction being executed to implement the steps of the method in the first embodiment or the second embodiment.

When being implemented in form of software functional module and sold or used as an independent product, the device in the embodiments of the disclosure may also be stored in a computer-readable storage medium. Based on such an understanding, the technical solutions of the embodiments of the disclosure substantially or parts thereof making contributions to the conventional art may be embodied in form of a software product, which is stored in a storage medium, including a plurality of instructions for enabling a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer program is stored, the computer program being configured to execute the method in the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for controlling cell search of User Equipment (UE), applied to the UE and comprising:
receiving frequency layer information corresponding to a Synchronization Signal and PBCH Block (SSR) index from a network side through a system broadcast;
determining at least one to-be-searched cell with a high frequency priority based on the frequency layer information corresponding to a retrieved SSB index, wherein the cell with a high frequency priority is a cell of which a frequency priority is higher than a frequency priority of a cell where the UE is presently located; and
searching the at least one to-be-searched cell with a high frequency priority based on a search time interval, wherein the search time interval is a minimum time interval, meeting a performance requirement, for all cells with high frequency priority,
the method further comprising:
receiving a correction factor broadcast togthere with the SSB index by the network side, wherein the correction factor is related to at least one of: the frequency priority of the cell where the LIE: is presently located, a load state in the network side, number of frequency priorities that can be acquired in a neighbor cell of the UE and is higher than that of the cell where the UE is presently located, and a highest priority that can be acquired in the neighbor cell;

acquiring, by the UE, a present SSB index and selecting a correction factor corresponding, to the present SSB index; and multiplying the search time interval by the correction factor corresponding to the present SSB index to obtain a corrected search time interval.

2. The method of claim 1, wherein the correction factor corresponding to the present SSB index is a second correction factor, and the method further comprises:

storing at least one first correction factor defined by a Radio Access Network 4 (RAN4), wherein each first correction factor corresponds to two dimensions: a difference value between the frequency priority of the cell where the UE is located and a target frequency priority to be searched by the UE, and the frequency priority of the cell where the UE is located.

3. The method of claim 2, further comprising:

determining the first correction factor based on the frequency priority of the cell where the UE is presently located and the target frequency priority to be searched by the UE;
and
determining a corrected search time interval based on the first correction factor and the second correction factor.

4. The method of claim 3, wherein determining the corrected search time interval based on the first correction factor and the second correction factor comprises:

multiplying the search time interval by the first correction factor and then by the second correction factor to obtain the corrected search time interval.

5. The method of claim 1, wherein the frequency layer information is a number of frequency layers, or frequencies of all neighbor cell frequency layers and neighbor cell configuration information corresponding to the frequencies.

6. A method for controlling cell search of User Equipment (UE), applied to a network device and comprising:

sending Synchronization Signal and PBCH Block (SSB)-index-based frequency layer information to UE through a system broadcast, wherein the SSB-index-based frequency layer information is configured for the UE to determine at least one to-be-searched cell with a high frequency priority based on frequency layer information corresponding to a retrieved SSB index and search the at least one to-be-searched cell with a high frequency priority based on a search time interval, wherein the cell with a high frequency priority is a cell of which a frequency priority is higher than a frequency priority of a cell where the UE is presently located, and the search time interval is a minimum time interval, meeting a performance requirement, for all cells with high frequency priority, the method further comprising:

determining a correction factor for the search time interval based on at least one of: the frequency priority of the cell where the UE is presently located, a load state in a network side, number of frequency priorities that can be acquired in a neighbor cell of the UE and is higher than that of the cell where the LIE is presently located, and a highest priority that can be acquired in the neighbor cell; and sending an SSR index and the correction factor corresponding to the SSB index to the UE through the system broadcast, to enable the UE to acquire a present SSB index and select a correction factor corresponding to the present SSB index, wherein the correction factor corresponding to the present SSB index is configured to correct the search time interval by multiplying the search time interval by the correction factor corresponding to the present SSB index to obtain a corrected search time interval.

7. The method of claim 6, wherein the frequency layer information is a number of frequency layers, or frequencies of all neighbor cell frequency layers and neighbor cell configuration information corresponding to the frequencies.

8. User Equipment (UE), comprising:

a processor;
a memory for storing a computer program executable by the processor; and
a network interface,
wherein the processor is configured to run the computer program to cooperate with the network interface to:
receive frequency layer information corresponding to a Synchronization Signal and PBCH Block (SSB) index from a network side through a system broadcast;
determine at least one to-be-searched cell with a high frequency priority based on the frequency layer information corresponding to a retrieved SSB index, wherein the cell with a high frequency priority is a cell of which a frequency priority is higher than a frequency priority of a cell where the UE is presently located; and
search the at least one to-be-searched cell with a high frequency priority based on a search time interval, wherein the search time interval is a minimum time interval, meeting a performance requirement, for all cells with high frequency priority,
wherein the processor is further configured to:
cooperate with the network interface to receive a correction factor broadcast together with the SSB index by the network side, wherein the correction factor is related to at least one of: the frequency priority of the cell where the UE is presently located, a load state in the network side, number of frequency priorities that can be acquired in a neighbor cell of the and is higher than that of the cell where the UE is presently located, and a highest priority that can be acquired in the neighbor cell;
acquire a present SSB index and select a correction factor corresponding to the present SSB index; and
multiply the search time interval by the correction factor corresponding to the present SSB index to obtain a corrected search time interval.

9. The UE of claim 8, wherein the correction factor corresponding to the present SSB index is a second correction factor, and the processor is further configured to store at least one first correction factor defined by a Radio Access Network 4 (RAN4), wherein each first correction factor corresponds to two dimensions: a difference value between the frequency priority of the cell where the UE is located and a target frequency priority to be searched by the UE, and the frequency priority of the cell where the UE is located.

* * * * *